United States Patent
Wallace

(10) Patent No.: US 11,217,908 B2
(45) Date of Patent: Jan. 4, 2022

(54) LAY-IN BONDING LUG WITH DUAL CONDUCTOR PATH

(71) Applicant: Zodiac Pool Systems LLC, Carlsbad, CA (US)

(72) Inventor: Scott Leslie Wallace, Temecula, CA (US)

(73) Assignee: ZODIAC POOL SYSTEMS LLC, Carlsbad, CA (US)

(*) Notice: Subject to any disclaimer, the term of this patent is extended or adjusted under 35 U.S.C. 154(b) by 0 days.

(21) Appl. No.: 16/819,548

(22) Filed: Mar. 16, 2020

(65) Prior Publication Data

US 2020/0313313 A1 Oct. 1, 2020

Related U.S. Application Data

(60) Provisional application No. 62/825,284, filed on Mar. 28, 2019.

(51) Int. Cl.
*H01R 4/36* (2006.01)
*F16B 2/06* (2006.01)
*H01R 4/30* (2006.01)
*H01R 13/6596* (2011.01)
*H01R 4/66* (2006.01)
(Continued)

(52) U.S. Cl.
CPC ............... *H01R 4/36* (2013.01); *F16B 2/065* (2013.01); *H01R 4/30* (2013.01); *H01R 4/34* (2013.01); *H01R 4/38* (2013.01); *H01R 4/46* (2013.01); *H01R 4/64* (2013.01); *H01R 4/66* (2013.01); *H01R 9/2483* (2013.01); *H01R 11/26* (2013.01); *H01R 13/6596* (2013.01)

(58) Field of Classification Search
CPC ... H01R 4/64; H01R 4/34; H01R 4/30; H01R 4/46; H01R 4/38; H01R 13/6596; H01R 11/26; H01R 4/643; H01R 4/36; H01R 13/648; H01R 4/66; H01R 9/2483; F16B 2/065
See application file for complete search history.

(56) References Cited

U.S. PATENT DOCUMENTS 2,222,156 A * 11/1940 Rowe ..................... H01R 4/366
439/812
4,946,405 A * 8/1990 Boehm ..................... H01R 4/36
439/387
(Continued)

FOREIGN PATENT DOCUMENTS

WO 2008098078 8/2008

OTHER PUBLICATIONS

International Application No. PCT/US2020/022918, International Search Report and Written Opinion dated Jun. 8, 2020, 14 pages.

*Primary Examiner* — Abdullah A Riyami
*Assistant Examiner* — Justin M Kratt
(74) *Attorney, Agent, or Firm* — Kilpatrick Townsend & Stockton LLP

(57) ABSTRACT

A bonding lug assembly includes a bonding lug and a set screw. The bonding lug includes a body that defines a first channel and a second channel. The first channel defines a first conductor path extending in a first direction, and the second channel defines a second conductor path extending in a second direction that is different from the first direction. The set screw is configured to selectively engage the bonding lug and retain a bonding conductor within at least one of the first channel or the second channel.

19 Claims, 7 Drawing Sheets

(51) Int. Cl.
 *H01R 11/26* (2006.01)
 *H01R 4/64* (2006.01)
 *H01R 4/46* (2006.01)
 *H01R 4/38* (2006.01)
 *H01R 4/34* (2006.01)
 *H01R 9/24* (2006.01)

(56) References Cited

U.S. PATENT DOCUMENTS

| | | | |
|---|---|---|---|
| 6,213,818 B1* | 4/2001 | Chadbourne | H01R 4/36 439/224 |
| 2015/0311638 A1* | 10/2015 | Smith | H01R 4/36 174/78 |

* cited by examiner

LAY-IN BONDING LUG WITH DUAL CONDUCTOR PATH

REFERENCE TO RELATED APPLICATIONS

This application claims the benefit of U.S. Provisional Patent Application No. 62/825,284, filed on Mar. 28, 2019, and entitled LAY-IN BONDING LUG WITH DUAL CONDUCTOR PATH, the content of which is hereby incorporated by reference in its entirety.

FIELD OF THE INVENTION

This application relates to equipotential bonding, and, more particularly, to lay-in bonding lugs used to bond wires and surfaces in bonding applications.

BACKGROUND

Equipotential bonding is a protective method used to increase user safety in certain areas by bonding or connecting the conductive and metallic objects in the area pool water, metal of parts of electrical equipment, metal piping, ladders, etc. to eliminate voltage gradients in an area (i.e., they all have the same potential energy). Oftentimes, equipotential bonding systems or grids are used in areas around bodies of water such as pools, spas, and hot tubs, among others. When the conductive objects are bonded together, they effectively eliminate differences in voltage potential that may exist between the individual components, and thereby reduce the shock hazard that would otherwise be present. The bonding connection between the various components of the bonding grid can be made by mechanically connecting the components to a bonding conductor, which may be an 8 AWG or larger copper wire or other suitable bonding conductor, with a bonding lug.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments of the present disclosure, a bonding lug includes a set screw support, a guide, a first channel, and a second channel. The first channel is defined between the set screw support and the guide, and the first channel defines a first conductor path extending in a first direction. The second channel extends through e set screw support and through the guide, and the second channel defines a second conductor path extending in a second direction that is different from the first direction.

According to some embodiments of the present disclosure, a bonding assembly includes a bonding lug and a set screw. The bonding lug includes a body defining a first channel and a second channel. The first channel defines a first conductor path extending in a first direction, and the second channel defines a second conductor path extending in a second direction that is different from the first direction. The set screw is configured to selectively engage the bonding lug and retain a bonding conductor within at least one of the first channel or the second channel.

According to various embodiments of the present disclosure, a bonding lug for an equipotential bonding system includes a body defining a first channel and a second channel. The first channel defines a first conductor path extending in a first direction, and the second channel defines a second conductor path extending in a second direction that is different from the first direction.

According to some embodiments of the present disclosure, an equipotential bonding system includes a bonding lug having a body defining a first channel and a second channel. The first channel defines a first conductor path extending in a first direction, and the second channel defines a second conductor path extending in a second direction that is different from the first direction. The equipotential bonding system also includes a bonding conductor retained within at least one of the first channel or the second channel.

Various implementations described in the present disclosure can include additional systems, methods, features, and advantages, which cannot necessarily be expressly disclosed herein but will be apparent to one of ordinary skill in the art upon examination of the following detailed description and accompanying drawings. it is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
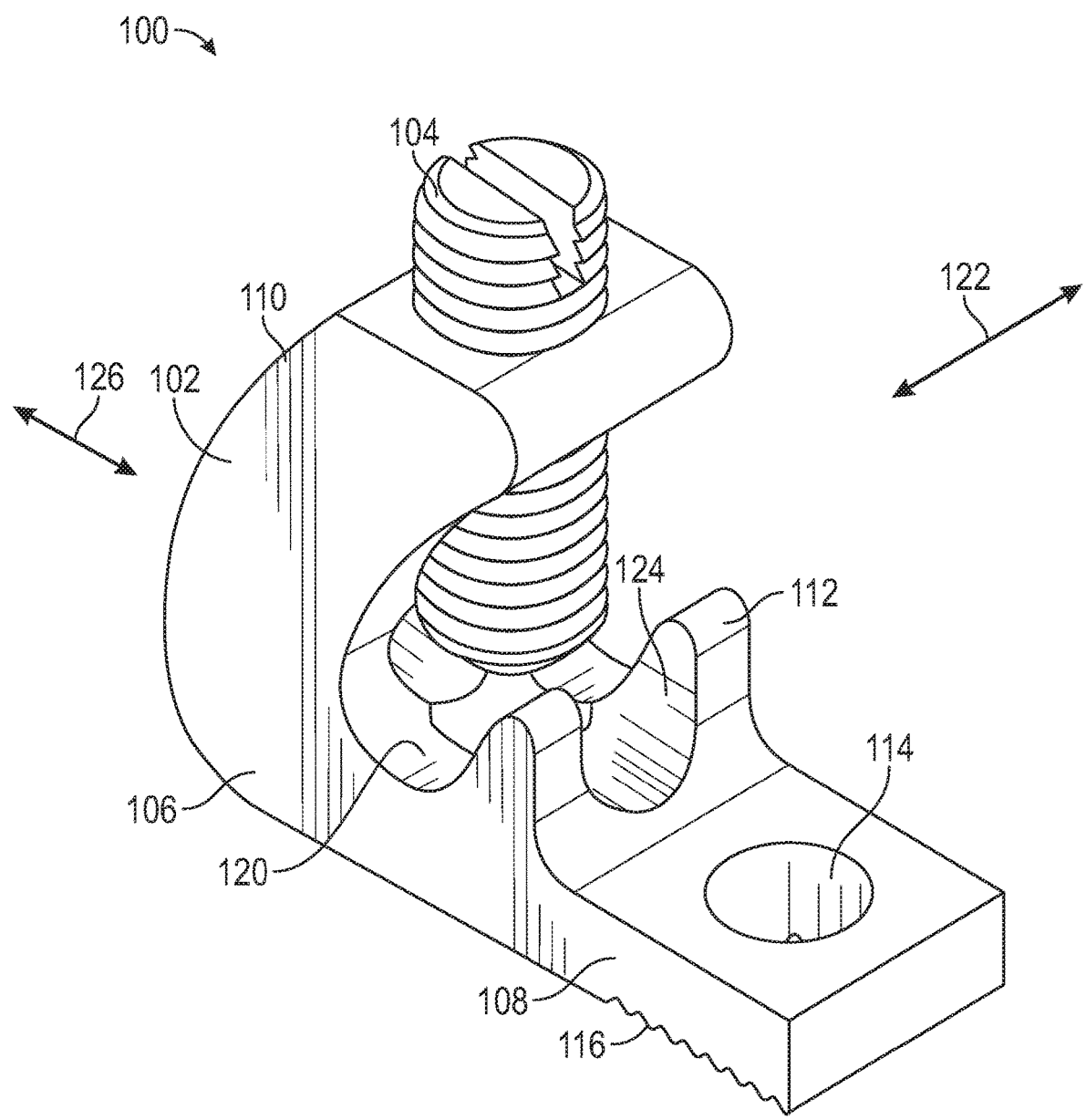
FIG. 1 is a perspective view of a bonding lug assembly including a bonding lug and a set screw according to aspects of the present disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

FIGS. 1-14 illustrate an example of a bonding lug assembly 100 according to aspects of the current disclosure. The bonding lug assembly 100 includes a first conductor path and a second conductor path such that the bonding lug assembly 100 can be utilized in a plurality of locations and in a plurality of orientations without requiring a different style of lug. The bonding lug assembly 100 may be utilized with an equipotential bonding system to connect various items to a bonding conductor (e.g., bonding wire). The bonding lug assembly 100 includes a bonding lug 102 and a set screw 104.

As illustrated in the figures, the bonding lug 102 includes a body 106 and a mounting flange 108. The mounting flange 108 defines a mounting aperture 114 that is configured to receive a mounting mechanism (e.g., a screw, pin, etc.) such that the bonding lug 102. can be secured to a component to be bonded or joined as part of the equipotential bonding system. In some optional examples, the mounting flange 108 includes a gripping portion 116 that facilitates positioning of the bonding lug 102 on the component to be bonded. The gripping portion 116 may include ridges defined in the mounting flange 108, other types of gripping features defined in the mounting flange, and/or various other suitable components attached to the mounting flange 108 that may facilitate positioning of the bonding lug 102. In some cases, the gripping portion 116 may facilitate positioning of the bonding lug 102 by increasing an amount of friction and/or surface area between the bonding lug 102 and the component to be bonded.

Figure 2:
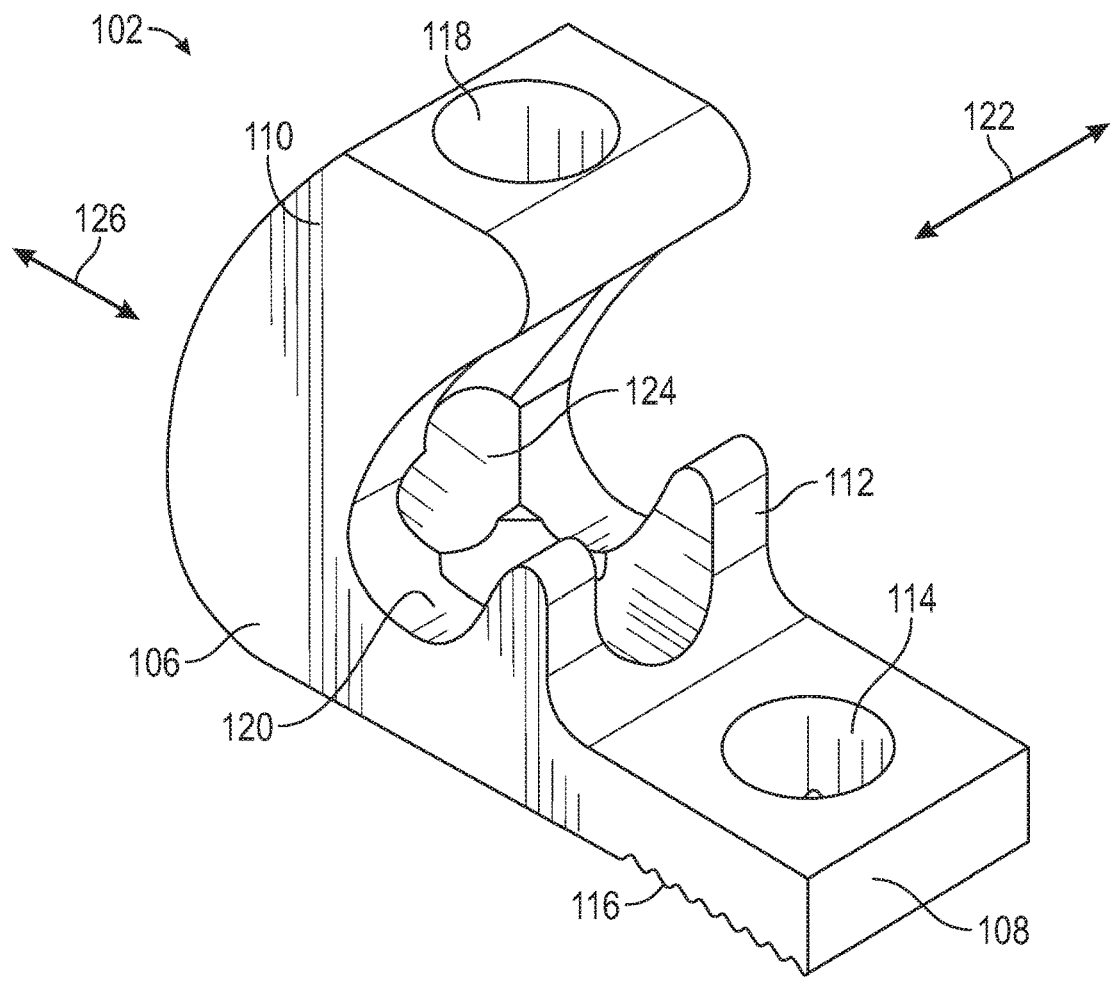
FIG. 2 is a perspective view of the bonding lug of FIG. 1.
Figure 3:
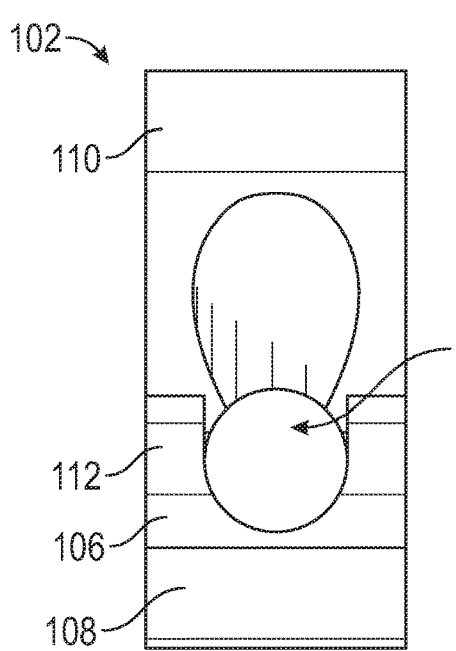
FIG. 3 is a front view of the bonding lug of FIG. 1.
Figure 4:
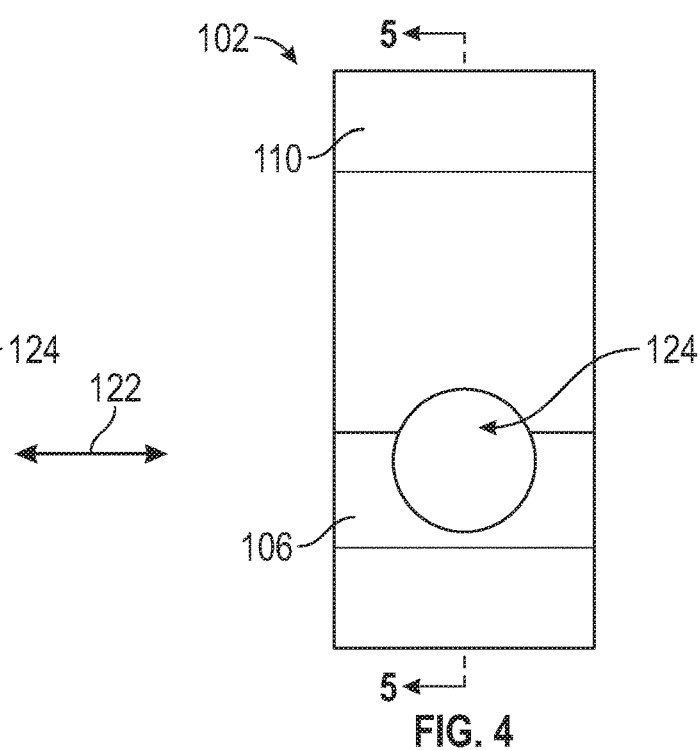
FIG. 4 is a rear view of the bonding lug of FIG. 1.
Figure 5:
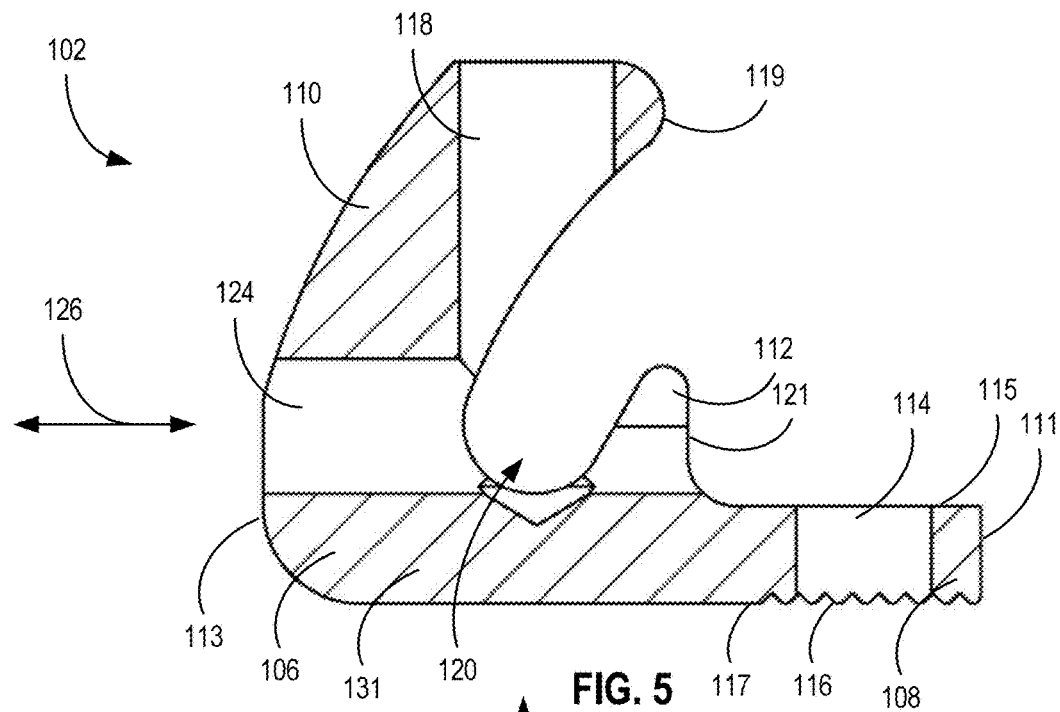
FIG. 5 is a sectional view of the bonding lug of FIG. 1 taken along line A-A in FIG. 4.
Figure 6:
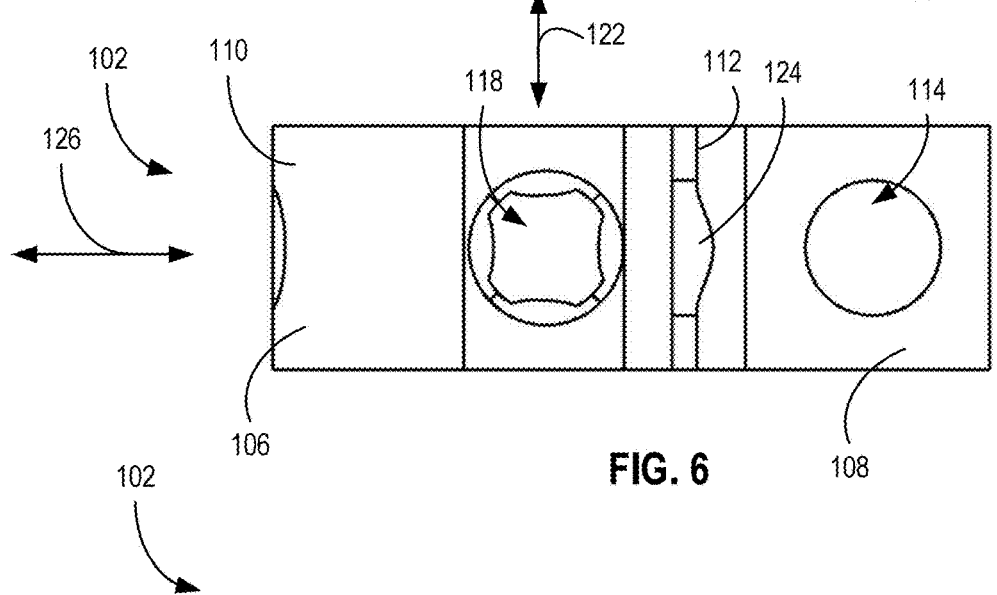
FIG. 6 is a top view of the bonding lug of FIG. 1.
Figure 7:
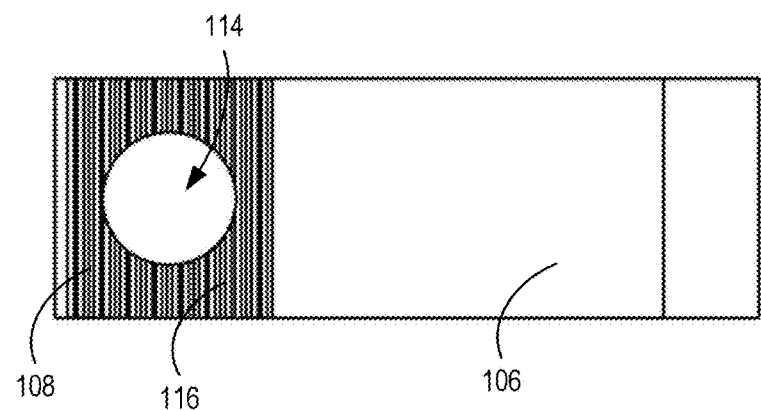
FIG. 7 is a bottom view of the bonding lug of FIG. 1.
Figure 8:
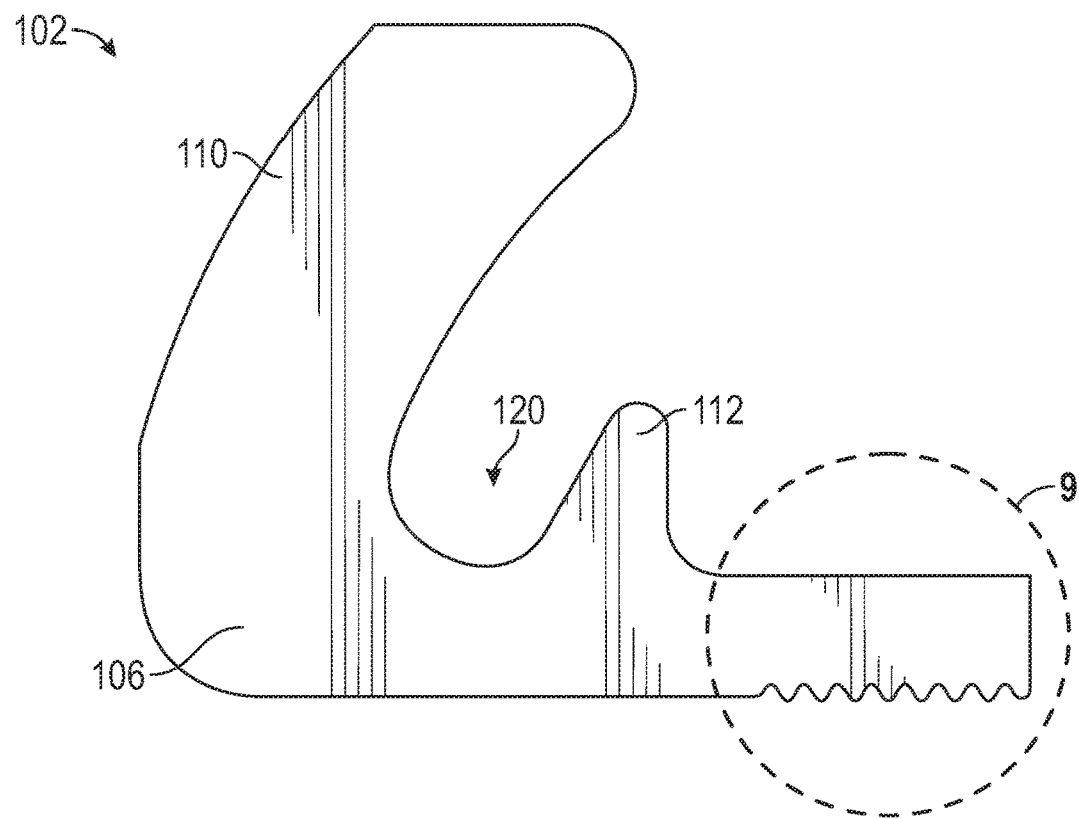
FIG. 8 is a side view of the bonding lug of FIG. 1.
Figure 9:
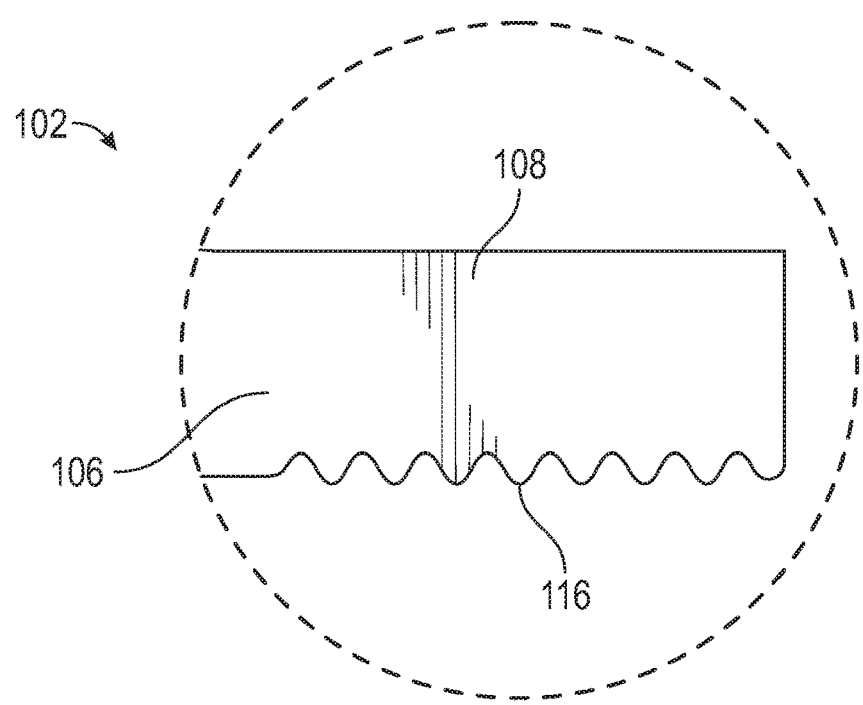
FIG. 9 is an enlarged view of the portion of the bonding lug in detail circle B in FIG. 8.

The body 106 of the bonding lug 102 includes a set screw support 110 and a guide 112. The body 106 may be constructed from various suitable materials for bonding applications including, but not limited to, copper, aluminum, or other suitable materials or combinations of materials. The body 106 includes a front end 111, a back end 113 opposite the front end 111, a top side 115, and a bottom side 117 opposite the top side 115. A base 131 extends from the front end 111 to the back end 113. The set screw support 110 includes a forward-most edge 119 relative to the front end 111 of the body 106, and the guide 112 includes a forward-most edge 121 relative to the front end 111 of the body 106. The set screw support 110 defines a set screw aperture 118 that is configured to receive the set screw 104 when the bonding lug assembly 100 is assembled. As best illustrated in FIGS. 1, 2, and 5, the body 106 includes a first channel 120 between the set screw support 110 and the guide 112. The first channel 120 defines a conductor path extending in a first direction 122. As best illustrated in FIGS. 1-3 and 5, the body 106 also includes a second channel 124 that extends through the set screw support 110 and through the guide 112 and defines a conductor path extending in a second direction 126 that is different from the first direction 122. In some examples, the second direction 126 is coplanar with the first direction 122, although it need not be in other examples. In various cases, the second direction 126 is substantially perpendicular to the first direction 122, although it need not be in other examples.

As illustrated in FIG. 5, in some examples, the set screw aperture 118 is defined in the set screw support 110 such that the set screw 104 positioned in the set screw aperture 118 can engage a bonding conductor in the first channel 120 and/or the second channel 124. In some cases, the set screw aperture 118 is aligned with the intersection of the first channel 120 and the second channel 124, although it need not be in other examples. In various aspects, the same set screw 104 can be utilized to connect to the bonding conductor in the first channel 120 and/or the second channel 122. In some optional examples, the set screw aperture 118 extends substantially perpendicular to the first channel 120 and the second channel 124, although it need not in other examples. In various cases, the set screw aperture 118 extends above the first channel 120 and the second channel 124, although it need not in other examples.

Figure 10:
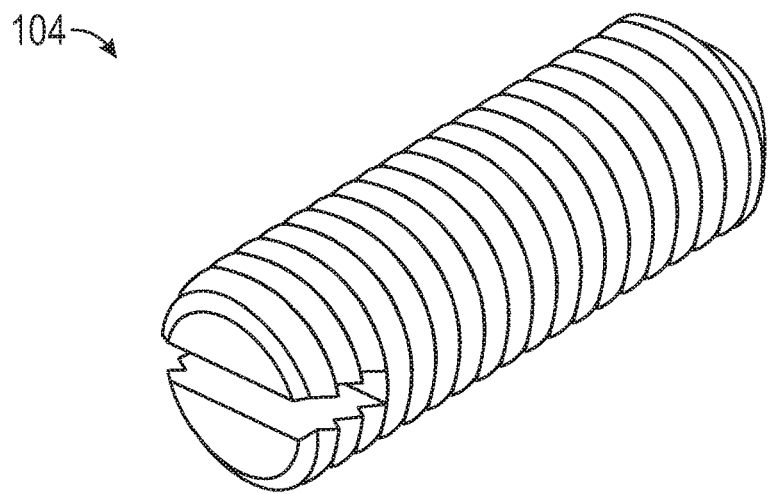
FIG. 10 is a perspective view of the set screw of FIG. 1.
Figure 11:
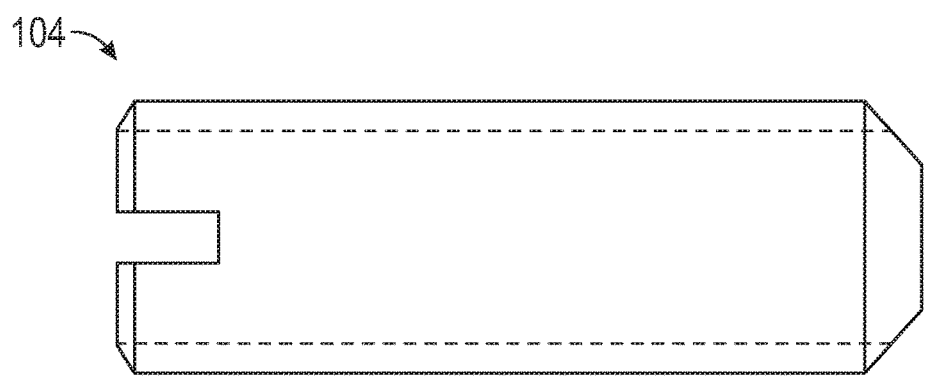
FIG. 11 is a side view of the set screw of FIG. 1 with threads of the set screw omitted for clarity.
Figure 12:
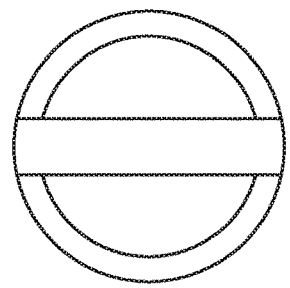
FIG. 12 is an end view of the set screw of FIG. 1.

FIGS. 10-12 illustrate the set screw 104. While a set screw 104 is illustrated, it will be appreciated that various other suitable mechanisms for securing the bonding lug assembly 100 to a bonding wire may be utilized, including, but not limited to, pins, rods, bolts, etc.

Figure 13:
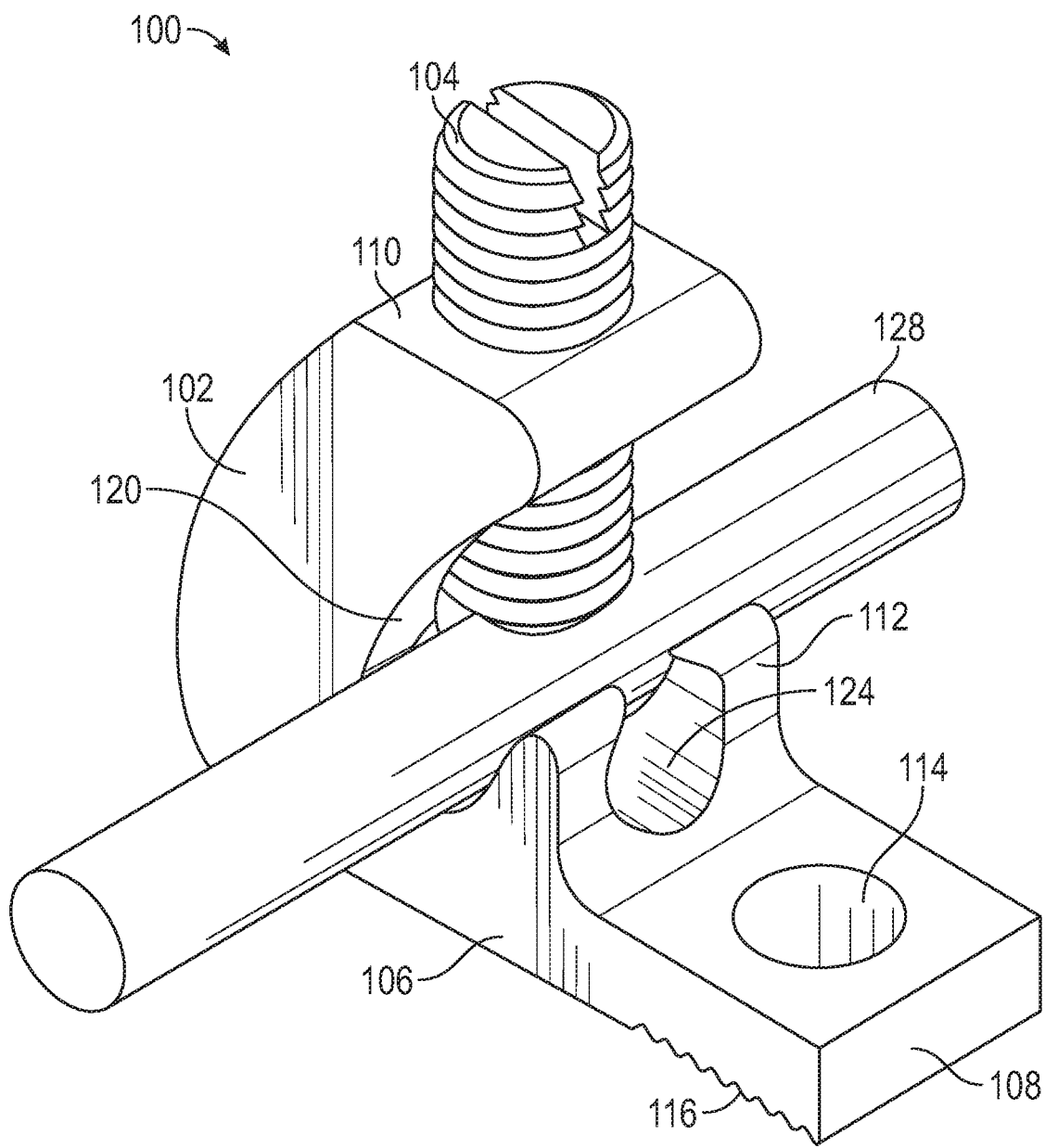
FIG. 13 is a perspective view of the bonding lug assembly of FIG. 1 with a bonding wire in a first conductor path of the bonding lug assembly.
Figure 14:
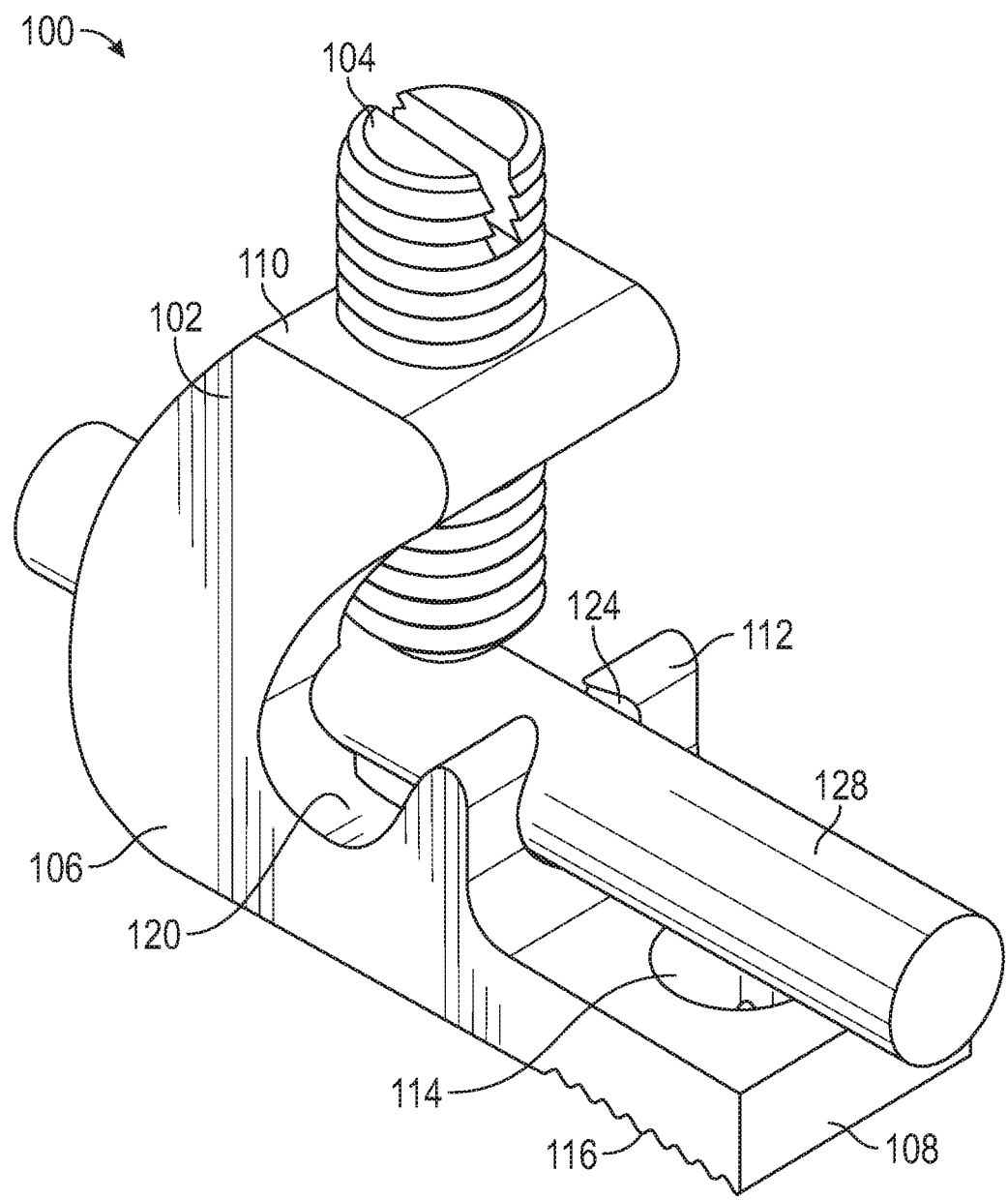
FIG. 14 is a perspective view of the bonding lug assembly of FIG. 1 with the bonding wire in a second conductor path of the bonding lug assembly.

FIG. 13 illustrates an example of a bonding wire 128 positioned in the first channel 120, As illustrated in FIG. 13, the bonding wire 128 is retained in the first channel 120 with the set screw 104. FIG. 14 illustrates an example of the bonding wire 128 positioned in the second channel 124. As illustrated in FIG. 14, the bonding wire 128 is at least partially retained in the second channel 124 with the set screw 104. In some cases, the bonding wire 128 may initially engage the bonding lug assembly 100 via the first channel 120 and leave the bonding lug assembly 100 via the second channel 124 (e.g., the bonding wire 128 may bend from the first direction 122 to the second direction 126 rather than extending along the first direction 122). In other words, the bonding lug 102 with the plurality of channels may be used in various locations when more than one path to the lug is required (e.g., in tight locations). By using the bonding lug assembly 100, the same bonding lug assembly 100 can be used to connect to the bonding wire 128 in various configurations or orientations.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

EC 1. A bonding lug comprising: a set screw support; a guide; a first channel defined between the set screw support and the guide, wherein the first channel defines a first conductor path extending in a first direction; and a second channel extending through the set screw support and through the guide, wherein the second channel defines a second conductor path extending in a second direction that is different from the first direction.

EC 2. The bonding lug of any of the preceding or subsequent example combinations, wherein the set screw support defines a set screw aperture that is aligned with an intersection of the first channel and the second channel.

EC 3. The bonding lug of any of the preceding or subsequent example combinations, wherein the set screw aperture is substantially perpendicular to the first direction and the second direction EC 4. The bonding lug of any of the preceding or subsequent example combinations, wherein the set screw aperture extends above the first channel and the second channel.

EC 5. The bonding lug of any of the preceding or subsequent example combinations, wherein the first direction and the second direction are coplanar.

EC 6. The bonding lug of any of the preceding or subsequent example combinations, wherein the first direction is substantially perpendicular to the second direction.

EC 7. The bonding lug of any of the preceding or subsequent example combinations, further comprising a mounting flange defining a mounting aperture, and wherein a bottom surface of the mounting flange comprises a gripping portion.

EC 8. An equipotential bonding system comprising: the bonding lug of any of the preceding or subsequent example combinations; and a bonding wire retained within at least one of the first channel or the second channel.

EC 9. A bonding lug assembly comprising: a bonding lug comprising a body defining a first channel and a second channel, wherein the first channel defines a first conductor path extending in a first direction, and wherein the second channel defines a second conductor path extending in a second direction that is different from the first direction; and a set screw configured to selectively engage the bonding lug and retain a bonding conductor within at least one of the first channel or the second channel.

EC 10. The bonding lug assembly of any of the preceding or subsequent example combinations, wherein the body of the bonding lug further comprises: a set screw support; and a guide, wherein the first channel is defined between the set screw support and the guide, and wherein the second channel extends through the set screw support and through the guide.

EC 11. The bonding lug assembly of any of the preceding or subsequent example combinations, wherein the bonding lug further comprises a mounting flange defining a mounting aperture, and wherein a bottom surface of the mounting flange comprises a gripping portion.

EC 12. The bonding lug assembly of any of the preceding or subsequent example combinations, wherein the set screw support defines a set screw aperture that is aligned with an intersection of the first channel and the second channel.

EC 13. The bonding lug assembly of any of the preceding or subsequent example combinations, wherein the set screw aperture is substantially perpendicular to the first direction and the second direction.

EC 14. The bonding lug assembly of any of the preceding or subsequent example combinations, wherein the set screw aperture extends above the first channel and the second channel.

EC 15. The bonding lug assembly of any of the preceding or subsequent example combinations, wherein the first direction and the second direction are coplanar.

EC 16. The bonding lug assembly of any of the preceding or subsequent example combinations, wherein the first direction is substantially perpendicular to the second direction.

EC 17. An equipotential bonding system comprising: the bonding lug assembly of any of the preceding or subsequent example combinations; and the bonding conductor retained within at least one of the first channel or the second channel.

EC 18. The equipotential bonding system of any of the preceding or subsequent example combinations, wherein the bonding conductor comprises a copper bonding wire.

EC 19. A bonding lug for an equipotential bonding system, the bonding lug comprising a body defining a first channel and a second channel, wherein the first channel defines a first conductor path extending in a first direction, and wherein the second channel defines a second conductor path extending in a second direction that is different from the first direction.

EC 20. The bonding lug of any of the preceding or subsequent example combinations, wherein the body further comprises: a set screw support; and a guide, wherein the first channel is defined between the set screw support and the guide, and wherein the second channel extends through the set screw support and through the guide.

EC 21. An equipotential bonding system comprising: a bonding lug comprising: a body defining a first channel and a second channel, wherein the first channel defines a first conductor path extending in a first direction, wherein the second channel defines a second conductor path extending in a second direction that is different from the first direction; and a bonding conductor retained within at least one of the first channel or the second channel.

EC 22. The equipotential bonding system of any of the preceding or subsequent example combinations, wherein the bonding conductor extends in both the first direction and the second direction.

EC 23. The equipotential bonding system of any of the preceding or subsequent example combinations, wherein the bonding conductor extends in the first direction or in the second direction.

EC 24. The equipotential bonding system of any of the preceding or subsequent example combinations, wherein the body further comprises a set screw support and a guide, wherein the first channel is defined between the set screw support and the guide, and wherein the second channel extends through the set screw support and through the guide.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that That which is claimed:

1. A bonding lug comprising:
a set screw support;
a base comprising a front end and a back end opposite from the front end, wherein the distance from the front end to the back end is a length of the bonding lug, and wherein the set screw support extends upwards from the base and comprises a front-most edge relative to the front end of the base;
a guide extending upwards from the base between the front end and the back end of the base, wherein the guide comprises a front-most edge, and wherein a distance between the front-most edge of the guide and the front end of the base is less than a distance between the front-most edge of the set screw support and the front end of the base;

a first channel defined between the set screw support and the guide, wherein the first channel defines a first conductor path extending in a first direction; and a second channel extending through the set screw support and through the guide, wherein the second channel defines a second conductor path extending in a second direction that is different from the first direction.

2. The bonding lug of claim 1, wherein the set screw support defines a set screw aperture that is aligned with an intersection of the first channel and the second channel.

3. The bonding lug of claim 2, wherein the set screw aperture is substantially perpendicular to the first direction and the second direction.

4. The bonding lug of claim 2, wherein the set screw aperture extends above the first channel and the second channel.

5. The bonding lug of claim 1, wherein the first direction and the second direction are coplanar.

6. The bonding lug of claim 1, wherein the first direction is substantially perpendicular to the second direction.

7. The bonding lug of claim 1, further comprising a mounting flange defining a mounting aperture, and wherein a bottom surface of the mounting flange comprises a gripping portion.

8. An equipotential bonding system comprising:
the bonding lug of claim 1; and
a bonding wire retained within at least one of the first channel or the second channel.

9. A bonding lug assembly comprising:
a bonding lug comprising:
  a set screw support;
  a base comprising a front end and a back end opposite from the front end, wherein the distance from the front end to the back end is a length of the bonding lug, and wherein the set screw support extends upwards from the base and comprises a front-most edge relative to the front end of the base;
  a guide extending upwards from the base between the front end and the back end of the base, wherein the guide comprises a front-most edge, and wherein a distance between the front-most edge of the guide and the front end of the base is less than a distance between the front-most edge of the set screw support and the front end of the base;
  a mounting aperture extending through the base between the front end and the guide;
  a first channel and a second channel, wherein the first channel defines a first conductor path extending in a first direction, wherein the second channel defines a second conductor path extending in a second direction that is different from the first direction, wherein the first channel is defined between the set screw support and the guide, and wherein the second channel extends through the set screw support and through the guide; and
a set screw configured to selectively engage the bonding lug and retain a bonding conductor within at least one of the first channel or the second channel.

10. The bonding lug assembly of claim 9, wherein the bonding lug further comprises a mounting flange defining a mounting aperture, and wherein a bottom surface of the mounting flange comprises a gripping portion.

11. The bonding lug assembly of claim 9, wherein the set screw support defines a set screw aperture that is aligned with an intersection of the first channel and the second channel.

12. The bonding lug assembly of claim 11, wherein the set screw aperture is substantially perpendicular to the first direction and the second direction.

13. The bonding lug assembly of claim 11, wherein the set screw aperture extends above the first channel and the second channel.

14. The bonding lug assembly of claim 9, wherein the first direction and the second direction are coplanar.

15. The bonding lug assembly of claim 9, wherein the first direction is substantially perpendicular to the second direction.

16. An equipotential bonding system comprising:
a bonding lug comprising:
  a set screw support;
  a base comprising a top side, a bottom side, a front end, and a back end opposite from the front end, wherein a distance from the front end to the back end is a length of the bonding lug, and wherein the set screw support extends upwards from the top side of the base and comprises a front-most edge relative to the front end of the base;
  a guide extending upwards from the top side base between the front end and the back end of the base, wherein the guide comprises a front-most edge, and wherein a distance between the front-most edge of the guide and the front end of the base is less than a distance between the front-most edge of the set screw support and the front end of the base;
  a gripping portion on the bottom side of the base and between the guide and the front end of the base, wherein a length of the gripping portion is less than the distance between the front-most edge of the guide and the front end of the base; and
  a first channel and a second channel,
  wherein the first channel defines a first conductor path extending in a first direction,
  wherein the second channel defines a second conductor path extending in a second direction that is different from the first direction; and
a bonding conductor retained within at least one of the first channel or the second channel.

17. The equipotential bonding system of claim 16, wherein the bonding conductor extends in both the first direction and the second direction.

18. The equipotential bonding system of claim 16, wherein the bonding conductor extends in the first direction or in the second direction.

19. The equipotential bonding system of claim 16, wherein the first channel is defined between the set screw support and the guide, and wherein the second channel extends through the set screw support and through the guide.

* * * * *